United States Patent [19]

Rivera

[11] Patent Number: 4,658,322
[45] Date of Patent: Apr. 14, 1987

[54] ARCING FAULT DETECTOR

[75] Inventor: Neftali Rivera, Vienna, Va.

[73] Assignee: The United States of America as represented by the Secretary of the Navy, Washington, D.C.

[21] Appl. No.: 373,082

[22] Filed: Apr. 29, 1982

[51] Int. Cl.$^4$ ............................................... H02H 5/04
[52] U.S. Cl. ...................................... 361/37; 361/106; 340/626
[58] Field of Search .................. 361/37, 106; 340/626, 340/646

[56]  References Cited
U.S. PATENT DOCUMENTS

| | | | |
|---|---|---|---|
| 2,553,291 | 5/1951 | Barr | 340/646 X |
| 3,445,726 | 5/1969 | Allen | 361/37 |
| 3,855,503 | 12/1974 | Ristuccia | |
| 4,067,052 | 1/1978 | Neuhoff | 361/42 |
| 4,223,364 | 9/1980 | Sangster | 361/37 |

OTHER PUBLICATIONS

Salvatone F. Cannova, IEEE Transactions on Industry Applications, Vo. IA-9, No. 5, Sep./Oct. 1973, pp. 553-538, "Short-Time Voltage Transients in Shipboard Electrical Systems".

Primary Examiner—A. D. Pellinen
Assistant Examiner—T. DeBoer
Attorney, Agent, or Firm—Thomas M. Phillips

[57]  ABSTRACT

An arcing fault detector used the thermodynamic conditions created by an arcing fault within a vented electrical equipment enclosure to quickly activate a protective device which causes tripping of the supply circuit breaker(s). A plurality of temperature sensors are located within the enclosure near the top, and a differential pressure sensor is located in the external wall of the enclosure approximately midway between the vents to compare internal and external pressure. The intelligence from the sensors is processed by a fault protector which controls the tripping of the circuit breaker(s).

6 Claims, 5 Drawing Figures

ARCING FAULT DETECTOR

BACKGROUND OF THE INVENTION

1. Field of the Invention

The present invention relates to systems for protecting electrical circuits, and in particular to an arcing fault detector which detects the presence of an arcing fault within an enclosed electrical equipment unit.

2. Description of the Prior Art

Arcing faults may be sub-classified as line-to-line faults or ground faults. There are several methods in present use by which these faults are detected and cleared. For ground faults the use of ground fault detectors in combination with window type current transformers is generally considered to be the most efficient and reliable method. The principle used in this method consists in monitoring the currents in the supply and return conductors of the circuit through a window type current transformer, the sum of the currents normally being equal to zero. The presence of a net current when all supply and return conductors are added together would indicate that some of the current is flowing through ground, which is a telltale of a ground fault. In this case the supply circuit breaker(s) is tripped open. The settings of the associated ground fault detectors can be very low (on the order of 3 percent of circuit capacity) because normally there is no intentional current flow through ground. Other methods of ground fault detection are less critical than the above. The use of an inverse-time-overcurrent relay in the neutral conductor of a grounded system cannot be set to detect low currents because of the normal neutral flow that occurs with phase unbalanced loads.

The detection of single phase or three phase line-to-line faults is accomplished by use of inverse-time-overcurrent relays or current differential relaying systems. The overcurrent relays are sensitive only to fault currents which exceed the circuit rated capacity by predetermined factors, following an inverse time characteristic. The higher the fault-to-rated-current ratio, the faster the clearing time would be. In circuits having more than one circuit breaker in series the sensitivity and speed of operation of the overcurrent relays have to be coordinated to permit the downstream protective devices to trip first. This results in a reduction in sensitivity to the supply circuit breakers.

The overcurrent relays are fully satisfactory in detecting faults having high current flow. The localized fault impedance is very low, and the current is limited by the distributed circuit impedance or the power source impedance. Fault induced heat is similarly distributed and not localized in the faulted enclosure.

The current differential relaying system operates on the principle of summation of all currents flowing in and out of its zone of protection and acts instantaneously to clear any fault. The sensitivity of this system is only limited by the matching of the saturation characteristics of the associated current transformers. In order to avoid nuisance tripping of circuit breakers under faults out of the zone of protection, but where fault current flowing through the circuit in question causes saturation of current transformers, the transformers must be perfectly matched or the sensing level must be increased to prevent relay pick-up caused by mismatch. The percentage differential relaying system improves on this condition. However, the sensitivity of relaying systems of this type is still limited to more than 5 percent of circuit rated capacity.

In arcing faults the resistance of the fault path limits the current to values that are often lower than the rated circuit capacity. If the circuit is not fully loaded with normal load when the fault is incepted, fault current may not even reach the rated full current value. The heat dissipated in the concentrated fault resistance is expressed in the formula:

$$H = I^2 R t$$

where I is fault current, R is fault resistance, and t is time in seconds. As a example, a line-to-line fault adding up to 100 amperes in a three phase 480 volt system would generate heat at a rate of 48 KW. If the protective device would take 10 seconds to clear, the internal heat of the faulted enclosure would be raised by 480,000 joules or 455 BTU.

Experience has shown that these faults tend to remain unchanged at low current values for relatively long periods. The concentrated dissipation of heat for long periods is what makes arcing faults so destructive to electrical equipment which relies on overcurrent relays for protection. The superior protective capabilities of the current differential relaying system are not regularly used because of the relatively high cost and complexity of such a system. In addition, a fault having the magnitude of the above example (100 amperes) incepted in a high current circuit (say 4000 amperes rated) would fall below the practical sensitivity of present state-of-the-art current differential systems. However, a fault of that magnitude is quite capable of destroying the average low voltage electrical equipment unit.

SUMMARY OF THE INVENTION

Accordingly, the present invention provides an arcing fault detector which uses the thermodynamic conditions created by an arcing fault within a vented electrical equipment enclosure to quickly activate a protective device which causes tripping of the supply circuit breaker(s). A plurality of temperature sensors are located within the enclosure near the top, and a differential pressure sensor is located in the external wall of the enclosure approximately midway between the vents to compare internal and external pressure. The intelligence from the sensors is processed by a fault protector which controls the tripping of the circuit breaker(s).

Therefore, it is an object of the present invention to provide an arcing fault detector which quickly detects and trips a circuit breaker within an electrical equipment enclosure.

Another object of the present invention is to provide an arcing fault detector which makes use of the thermodynamic characteristics of an arcing fault within conflicting with the coordination of protective devices which are based on use of electrical parameters.

Still another object of the present invention is to provide an arcing fault detector which is sensitive yet immune to electromagnetic interference.

Other objects, advantages and novel features of the present invention will be apparent from the following detailed description when read in conjunction with the appended claims and attached drawing.

BRIEF DESCRIPTION OF THE DRAWING

FIG, 1 is a block diagram of an arcing fault detector according to the present invention.

DESCRIPTION OF THE PREFERRED EMBODIMENT

Figure 1:
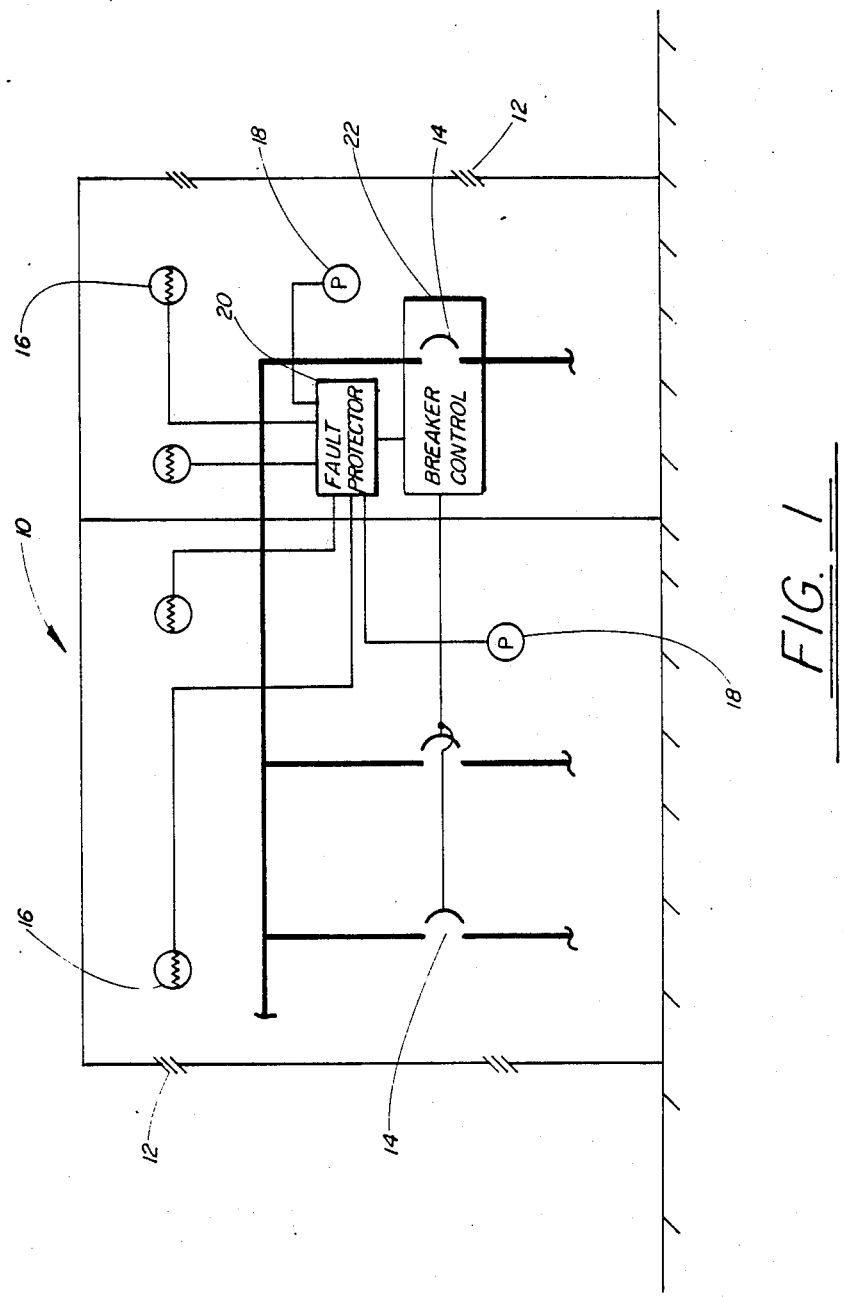

Referring now to FIG. 1 an arcing fault detector is shown for an electrical equipment enclosure 10 having vents 12 and containing one or more circuit breakers 14. A temperature sensor 16 is mounted within the enclosure 10, generally near the top, to monitor the temperature of the internal air. A differential pressure sensor 18 is mounted in the external wall of the enclosure 10, preferably equidistant from the vents 12, to compare the internal pressure to the external pressure. A fault protector circuit 20 receives the output from the sensors 16, 18 and determines based upon predetermined criteria whether an arcing fault is present. A breaker control circuit 22 receives a signal from the fault protector circuit 20 when an arcing fault is detected to trip the appropriate circuit breaker 14.

Figure 2:
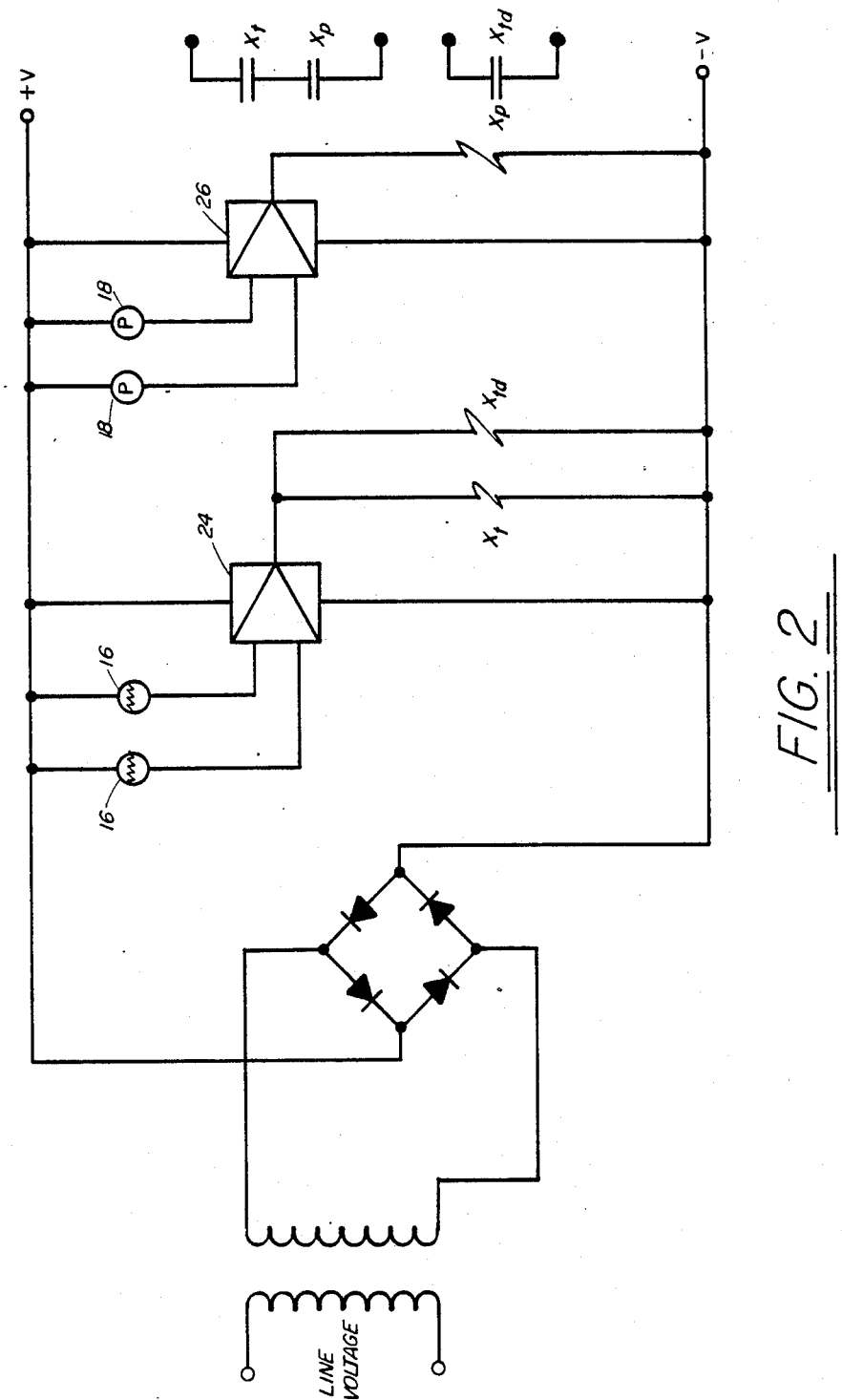
FIG. 2 is a schematic diagram of a fault protector and breaker controls for the arc fault detector.

As shown in FIG. 2, the inputs from the temperature and pressure sensors 16, 18 are amplified by differential amplifiers 24, 26. The output of the temperature differential amplifier 24 drives the switching coils $X_t$ and $X_{td}$ for a normal temperature relay and an optional temperature time delay relay. The output of the pressure differential amplifier 26 drives the switching coil $X_p$ for a pressure relay. The contacts $X_t$ and $X_p$ of the normal temperature and pressure relays are connected in series to provide an arcing fault signal, while the optional temperature time delay relay provides a tripping signal when the arcing fault is of an incipient nature (pyrolysis of insulation, etc.). The output levels of the differential amplifier 24,26 are set at such levels that normal temperatures and slight pressure differentials do not produce false fault indications.

Figure 3:
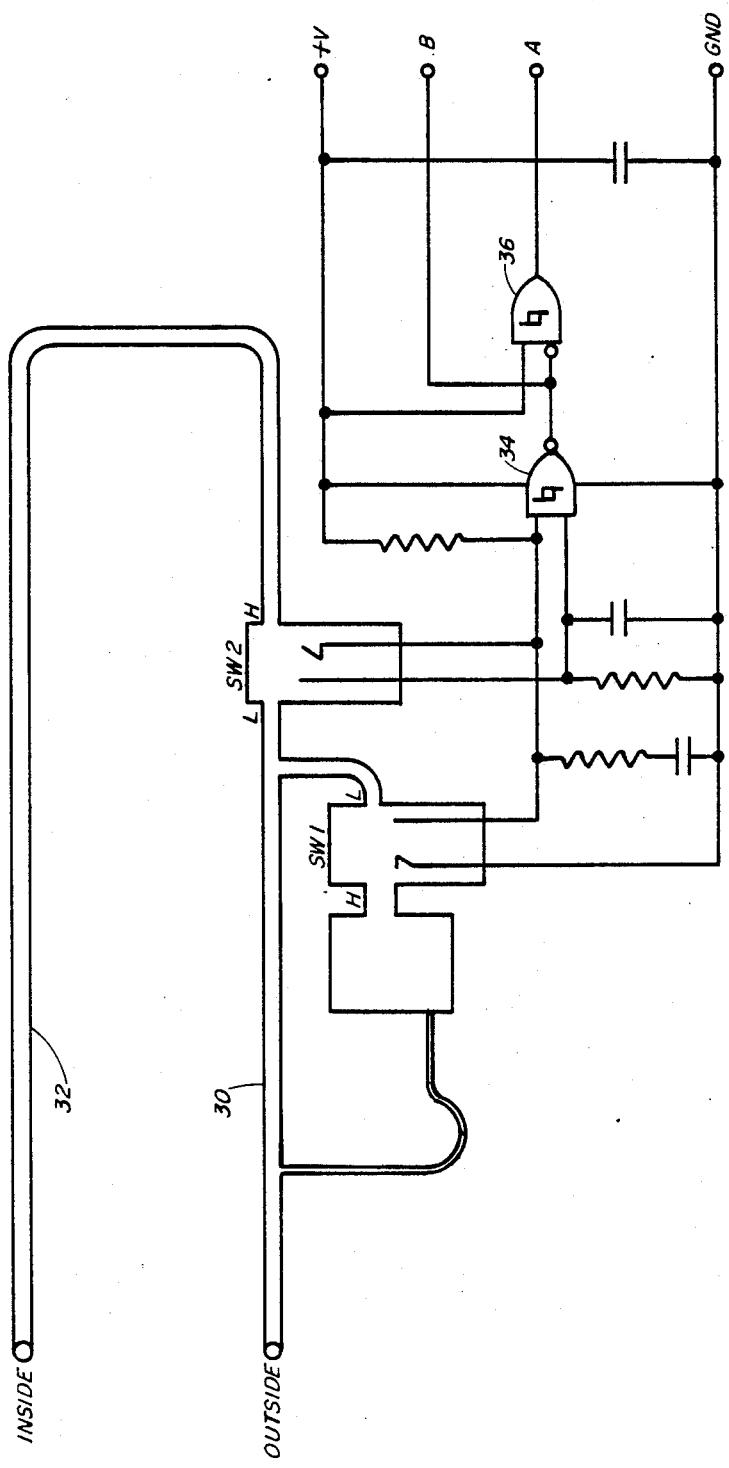
FIG. 3 is a schematic diagram of a differential pressure detector sensor with associated electrical circuity.

One configuration of the pressure sensor 18 is shown in greater detail in FIG. 3. A first differential pressure sensor SW1 is configured as a differentiator switch to filter any "noise" variations in ambient pressure. The first pressure sensor SW1 is connected to the outside pressure line 30. A second differential pressure sensor SW2 is connected between the outside pressure line 30 and an interior pressure line 32 to measure the differential pressure. The differential pressure is amplified and/or supervised by a first amplifier 34 and a second amplifier 36 connected in a common mode blocking mode. The RC values at the input of the first amplifier 34 determine the sensitivity of the circuit.

Figure 4:
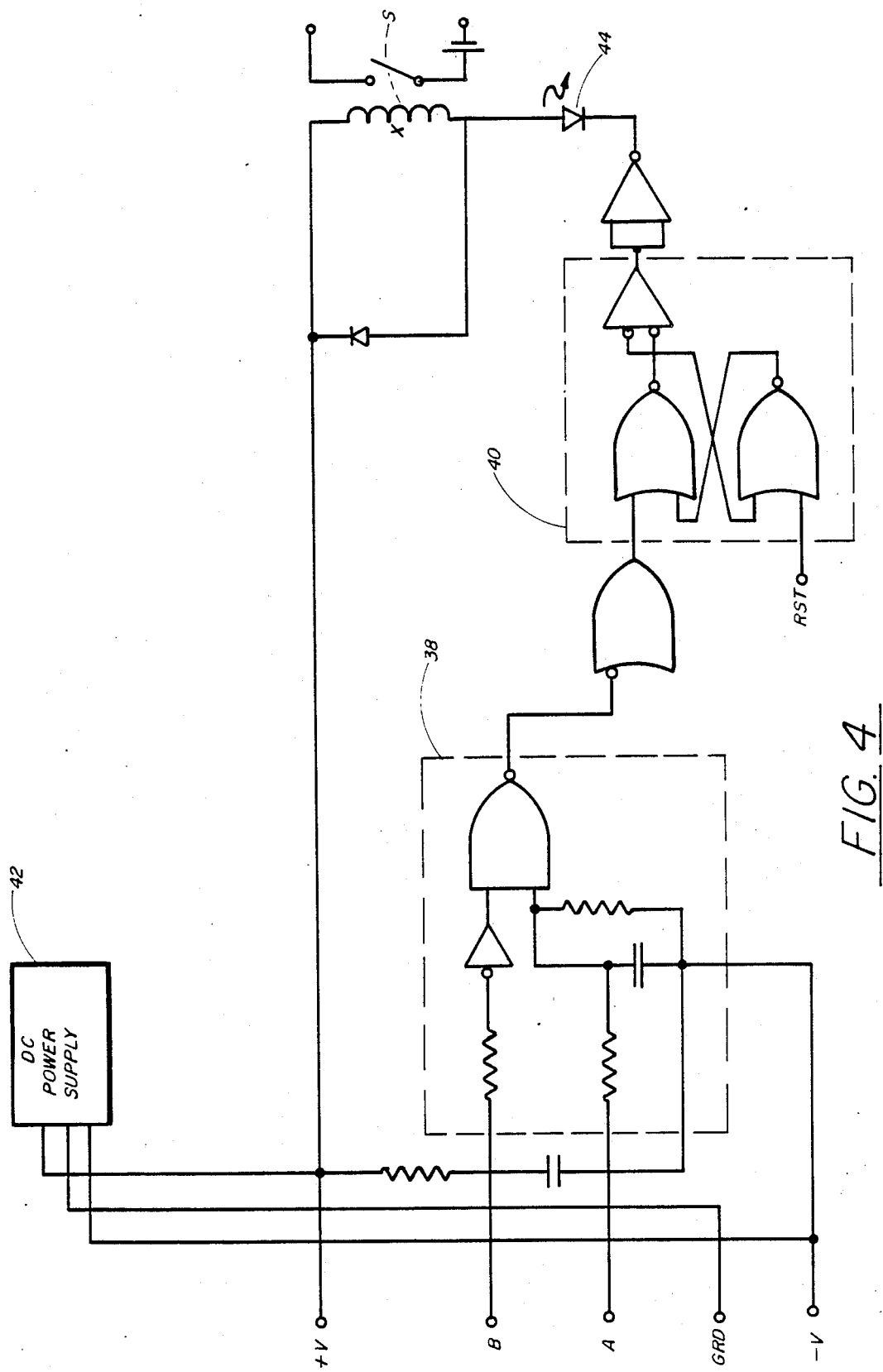
FIG. 4 is a schematic diagram of an arcing fault logic circuit for each detecting sensor.

Another configuration of the arcing fault logic circuit for each sensor, shown in FIG. 4, has a Schmidt trigger 38 to which the sensor outputs are input. The Schmidt trigger 38 sets a latch 40 which energizes a coil X to close contacts S. A dc power supply 42 provides the requisite power from an ac line for the sensor circuits and the associated logic circuits. An LED 44 gives a visual indication of the energization of the coil X. A RST, either manual or automatic, resets the latch 40 after the cause of the fault has been remedied.

The heat dissipated by an arcing fault increases at a very fast rate the internal energy of the air within the enclosure 10. The increase in air temperature also causes the mixture of arc plasma and air to expand very rapidly, explosive in nature. In drip-proof or outdoor metal clad enclosures 10 the air vents 12 present resistance to the motion of the expanding internal air resulting in an internal pressure buildup. Under normal operating conditions the internal air temperatures of the vented enclosure 10 would not reach in excess of 105° C. and the internal air pressure would equal the ambient atmospheric pressure. As a result of the fault the temperature increases to a high value and stays there for the duration of the fault, and the internal air pressure increases to a peak value and then falls back to a value near initial ambient as it equalizes through the vents 12. The short transient behavior of the internal air pressure is dictated by the limited initial volume of cool internal air which is quickly heated by the fault heat. The temperature sensor 16 and differential pressure sensor 18 provide the falt protector circuit 20 with the intelligence data about internal air temperature and pressure. If there is a rapid temperature buildup with concomitant pressure buildup, the breaker circuit control 22 is activated to trip the appropriate circuit breaker 14 within tens of milliseconds. If the heat buildup is slow, then the fault protector circuit will signal the breaker control circuit 22 to trip the appropriate breaker 14 after a time delay to guard against brief overloads which would create nuisance tripping of the breakers. Protection against high fault currents is still provided by standard overcurrent or differential protective devices (not shown).

Figure 5:
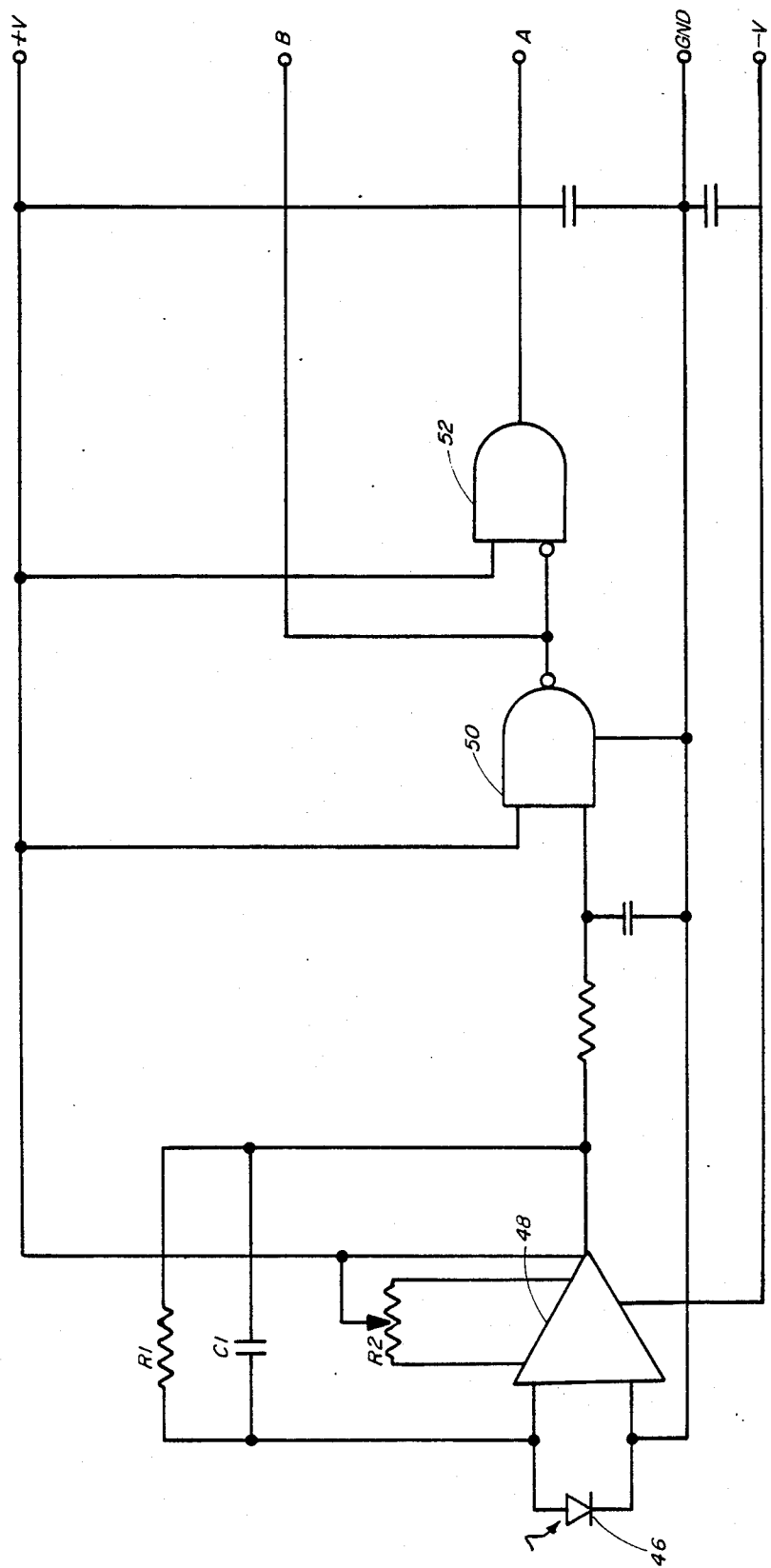
FIG. 5 is a schematic diagram of an alternate detector sensor with associated electrical circuitry.

To provide even faster response photic detectors as shown in FIG. 5 also may be used with or in place of temperature sensors to detect the light generated by an arc fault. A photodiode 46 detects the light and the electrical output is amplified by an amplifier 48. The output of the amplifier 48 is then passed through the additional gates 50,52 to provide the signals to input to the logic circuit shown in FIG. 4. The photodiode 46 gets its light signals from fiber optic transmission lines having opaque filters to block low intensity light reflections so it reacts only to the high temperature light of an arc. Thin film thermopiles strategically located within the enclosure 10 to minimize the time lag in plasma displacement within the protected volume may be substituted for or used in parallel with the photodiode 46.

Therefore, the present invention provides an arc fault detector which monitors thermodynamic parameters so that its sensitivity to the damage causing factor, heat, can be refined without concern with potential effects of electrical phenomena such as current surges or conflict with overcurrent relay coordination. The detector can be incorporated readily into existing switchboards without impact on existing system protective schemes, and provides rapid response to an arcing fault.

What is claimed is:

1. An arcing fault detection system for an electrical equipment enclosure having vents to an ambient atmosphere comprising:
    means for monitoring the temperature of the atmosphere within said electrical equipment enclosure;
    means for comparing the pressure of said ambient atmosphere to the pressure of the atmosphere within said electrical equipment enclosure;
    means for determining from the output of said monitoring means and said comparing means based upon predetermined temperature and pressure differential criteria whether an arcing fault is present; and means for tripping a circuit breaker when said arcing fault is detected by said determining means.

2. An arcing fault detection system as recited in claim 10 wherein said temperature monitoring means comprises:
   means for sensing said temperature within said enclosure and for converting said temperature to an electrical signal; and
   means for amplifying and for buffering said electrical signal prior to input to said determining means.

3. An arcing fault detection system as recited in claim 2 wherein said temperature sensing and converting means comprises a plurality of thin film thermopiles located within said enclosure.

4. An arcing fault detection system as recited in claim 1 wherein said temperature monitoring means comcomprises:
   a first differential pressure switch connected to an ambient pressure line to filter any variations in ambient atmospheric pressure;
   a second differential pressure switch connected between said ambient pressure line and an interior pressure line to detect changes in the pressure differential between said ambient atmosphere and said intention of said enclosure; and
   means connected to the outputs of said first and second differential pressure switches for amplifying and for buffering said outputs prior to input to said determining means.

5. An arcing fault detection system as recited in claim 1 wherein said determining means comprises a differential amplifier which compares the outputs of said monitoring means and said comparing means with threshold values to determine whether an arcing fault is present.

6. An arcing fault detection system as recited in claim 1 wherein said determining means comprises:
   a Schmidt trigger to which the output of said monitoring means and said comparing means is input, said Schmidt trigger providing an output when the outputs of said monitoring means and said comparing means exceed respective threshold levels;
   a latch which is set by said output of said Schmidt trigger;
   means for signaling said tripping means that an arc fault has been detected; and
   means for resetting said latch when said arcing fault has been cleared.

* * * * *

UNITED STATES PATENT AND TRADEMARK OFFICE
CERTIFICATE OF CORRECTION

PATENT NO. : 4,658,322

DATED : 04/14/87

INVENTOR(S) : Rivera, Neftali

It is certified that error appears in the above—identified patent and that said Letters Patent is hereby corrected as shown below:

Title page, delete item 73. Column 1, line 3 insert --The invention described herein may be manufactured and used by or for the Government of the United States of America for Governmental purposes without payment of any royalties thereon or therefor--. Column 2, line 55, change "within" to --without--. Column 2, line 57, change "are" to --is--. Column 4, line 18, change "falt" to --fault--.

Signed and Sealed this

Twenty-ninth Day of December, 1987

Attest:

DONALD J. QUIGG

Attesting Officer

Commissioner of Patents and Trademarks